United States Patent
Blom et al.

(10) Patent No.: US 12,030,467 B2
(45) Date of Patent: Jul. 9, 2024

(54) AUTOMATED GUIDED VEHICLE AND METHOD OF CONTROLLING AUTOMATED GUIDED VEHICLE

(71) Applicant: ABB Schweiz AG, Baden (CH)

(72) Inventors: Jonatan Blom, Sundbyberg (SE); Jonas Larsson, Västerås (SE)

(73) Assignee: ABB Schweiz AG, Baden (CH)

( * ) Notice: Subject to any disclaimer, the term of this patent is extended or adjusted under 35 U.S.C. 154(b) by 316 days.

(21) Appl. No.: 17/596,877

(22) PCT Filed: Jun. 26, 2019

(86) PCT No.: PCT/EP2019/067051
§ 371 (c)(1),
(2) Date: Dec. 20, 2021

(87) PCT Pub. No.: WO2020/259829
PCT Pub. Date: Dec. 30, 2020

(65) Prior Publication Data
US 2022/0306051 A1    Sep. 29, 2022

(51) Int. Cl.
*B60S 9/04* (2006.01)
*B60B 33/00* (2006.01)
*B62D 63/02* (2006.01)

(52) U.S. Cl.
CPC ............ *B60S 9/04* (2013.01); *B60B 33/0049* (2013.01); *B62D 63/02* (2013.01)

(58) Field of Classification Search
CPC ........ B62D 63/02; B60B 33/0049; B60S 9/04
See application file for complete search history.

(56) References Cited

U.S. PATENT DOCUMENTS 3,825,087 A    7/1974    Wilson
4,328,545 A *  5/1982    Halsall ............... G06Q 10/08
                                                        701/532
(Continued)

FOREIGN PATENT DOCUMENTS

CN    207274770 U    4/2018
CN    108081946 A    5/2018
(Continued)

OTHER PUBLICATIONS

Chinese Office Action and Search Report; Application No. 201980097619X; Completed: Feb. 16, 2023; 15 Pages.
(Continued)

*Primary Examiner* — Tan Q Nguyen
(74) *Attorney, Agent, or Firm* — Whitmyer IP Group LLC

(57) ABSTRACT

An AGV including a support structure and at least one drive unit connected to the support structure, wherein each drive unit includes a wheel rotatable about a wheel axis and about a steering axis perpendicular to the wheel axis; a wheel motor arranged to drive the wheel about the wheel axis; and a steering motor arranged to drive the wheel about the steering axis; wherein the AGV further includes at least one actuation member movable in an additional degree of freedom; and wherein the at least one actuation member is arranged to be driven by the wheel motor and/or the steering motor of at least one drive unit in the additional degree of freedom. A method of controlling an AGV is also provided.

17 Claims, 9 Drawing Sheets

(56) References Cited

U.S. PATENT DOCUMENTS

| | | | | |
|---|---|---|---|---|
| 2007/0107620 A1* | 5/2007 | Wagner | ............... | A63H 19/30 |
| | | | | 104/53 |
| 2012/0006609 A1* | 1/2012 | Doan | ............... | B62D 7/023 |
| | | | | 180/218 |
| 2012/0221186 A1* | 8/2012 | Bourquin | ............... | B60B 39/00 |
| | | | | 701/23 |
| 2017/0036893 A1* | 2/2017 | Schults | ............... | B66C 19/007 |
| 2017/0341465 A1 | 11/2017 | Zdrahal et al. | | |
| 2018/0096299 A1 | 4/2018 | Jarvis et al. | | |
| 2022/0063965 A1* | 3/2022 | Minami | ............... | B66C 13/48 |

FOREIGN PATENT DOCUMENTS

| | | | |
|---|---|---|---|
| CN | 108313257 | A | 7/2018 |
| CN | 108528315 | A | 9/2018 |
| CN | 108909880 | A | 11/2018 |
| CN | 208469981 | U | 2/2019 |
| CN | 109733463 | A | 5/2019 |
| DE | 102015107102 | A1 | 11/2016 |
| DE | 102017011058 | A1 | 5/2019 |
| EP | 2363338 | A1 | 9/2011 |
| JP | 2007216936 | A | 8/2007 |
| NZ | 539543 | A | 2/2008 |
| WO | 2011090755 | A2 | 7/2011 |
| WO | 2011090755 | A3 | 10/2011 |

OTHER PUBLICATIONS

Second Chinese Office Action; Application No. 201980097619X; Issued: Aug. 30, 2023; 17 Pages.

International Search Report and Written Opinion of the International Searching Authority; Application No. PCT/EP2019/067051; Completed: Mar. 9, 2020; Mailing date: Mar. 17, 2020; 10 Pages.

International Preliminary Report on Patentability; Application No. PCT/EP2019/067051; Completed: Dec. 28, 2021; 7 Pages.

European Office Action; Application No. EP 19740489.0; Completed: Dec. 21, 2023; 7 Pages.

* cited by examiner

AUTOMATED GUIDED VEHICLE AND METHOD OF CONTROLLING AUTOMATED GUIDED VEHICLE

TECHNICAL FIELD

The present disclosure generally relates to automated guided vehicles. In particular, an automated guided vehicle and a method of controlling an automated vehicle, are provided.

BACKGROUND

Automated guided vehicles (AGVs) are typically self-powered, self-driven vehicles used to transport materials and other items from one location to another, without the need for a driver on the vehicle. AGVs are commonly used in manufacturing sites, warehouses, post offices, libraries, port terminals, airports, and some hazardous locations and specialty industries.

CN 208469981 U discloses a logistics distribution robot. The robot comprises an underframe, a steering mechanism and wheeled traveling mechanisms.

SUMMARY

Some AGVs are designed to only carry a load between two locations. In some applications, it may be desirable that the AGV can perform mechanical functions in addition to pure navigation of the AGV.

One object of the present disclosure is to provide an AGV, which AGV effectively provides additional functionality. With additional functionality is meant functionality in addition to navigation of the AGV.

A further object of the present disclosure is to provide an AGV, which AGV can effectively drive an additional actuation member. With additional actuation member is meant a mechanical actuator in addition to wheels of the AGV.

A still further object of the present disclosure is to provide an AGV, which AGV has a simple design.

A still further object of the present disclosure is to provide an AGV, which AGV has a cheap design.

A still further object of the present disclosure is to provide an AGV, which AGV can selectively increase its stability in an effective manner.

A still further object of the present disclosure is to provide an AGV, which AGV can efficiently rotate and/or lift a support surface, for example at standstill of the AGV.

A still further object of the present disclosure is to provide an AGV, which AGV solves several or all of the foregoing objects in combination.

A still further object of the present disclosure is to provide a method of controlling an AGV, which method solves one, several or all of the foregoing objects.

According to one aspect, there is provided an AGV comprising a support structure and at least one drive unit connected to the support structure, wherein each drive unit comprises a wheel rotatable about a wheel axis and about a steering axis perpendicular to the wheel axis, the wheel axis providing a first degree of freedom for the drive unit and the steering axis providing a second degree of freedom for the drive unit; a wheel motor arranged to drive the wheel about the wheel axis; and a steering motor arranged to drive the wheel about the steering axis; wherein the AGV further comprises at least one actuation member movable in an additional degree of freedom; and wherein the at least one actuation member is arranged to be driven by the wheel motor and/or the steering motor of at least one drive unit in the additional degree of freedom.

The at least one actuation member may be arranged to be driven only by the steering motors of one or more drive units. In this case, the actuation member can be moved in the additional degree of freedom at standstill of the AGV.

The steering motor and the wheel motor of each drive unit are used to steer and drive, respectively, the wheel of the AGV. The steering motors and the wheel motors are thus used for movement or navigation of the AGV. Since the wheel motor and/or the steering motor of one or more drive units are used to also drive one or more actuation members in an additional degree of freedom, new functionality can be added to the AGV in an effective manner, e.g. without adding dedicated motors for driving the one or more actuation members. By "reusing" already existing components of the AGV in this way, the number of components of the AGV can be reduced. The AGV can thereby be made cheaper and simpler.

The actuation member may be of various types. One or more actuation members may for example be used to increase stability of the AGV, to carry out or assist in carrying out a work function, and/or to change the geometry of the support structure. The AGV may comprise at least two, such as at least three, such as at least four drive units having a wheel drivable by a steering motor and a wheel motor.

The at least one actuation member may be arranged to be driven by the steering motor of at least one drive unit in the additional degree of freedom. For example, the at least one actuation member may be arranged to be driven only by the steering motor of one or more drive units.

The AGV may further comprise a steering clutch arranged to selectively couple the steering motor of one of the at least one drive unit to the actuation member. The steering clutch may be an interference clutch. The steering motor can position the wheel about the steering axis with high accuracy. This enables the use of a relatively cheap interference clutch. Alternatively, or in addition, the AGV may further comprise an actuation member clutch arranged to selectively lock the actuation member in the additional degree of freedom.

As an alternative to the steering clutch, the steering motor of one of the at least one drive unit may be permanently coupled to the actuation member. In this case, the actuation member may be positioned to move in an inactive range during navigation of the AGV. For example, one or more pillars may be raised to move in an inactive range above a floor when the AGV navigates on the floor.

The AGV may further comprise a transmission arranged to transmit a rotation of the steering motor of one or more of the at least one drive unit to a movement of the actuation member in the additional degree of freedom. The transmission may comprise a belt.

The actuation member may be a pillar arranged to raise and lower the support structure. When the support structure is raised from a floor, also the wheels may be raised from the floor. The pillar further increases the stability of the AGV.

The pillar may be driven in the additional degree of freedom by threadingly engaging the pillar with a threaded sleeve and by rotating the sleeve. The sleeve may for example be rotated by means of a belt. The sleeve may be held in position along the additional degree of freedom by means of an arm fixed to the support structure. The sleeve may be rotationally coupled to the arm.

Alternatively, or in addition, the actuation member may be a telescopic member. The telescopic member may be provided with an actuation member clutch arranged to selectively lock the telescopic member in the additional degree of freedom. The actuation member clutch may comprise an actuator configured to extend and retract an actuator pin.

A further example of actuation members according to the present disclosure are outriggers for increasing stability of the AGV. A further example of an actuation member according to the present disclosure is a lifting mechanism in the support structure, e.g. for lifting a payload. Such lifting mechanism may for example be driven by a rack and pinion drive. The pinion may be driven by the steering motor of the one of more drive units.

The actuation member may be arranged to be driven by the wheel motor of one or more of the at least one drive unit in the additional degree of freedom. For example, the support structure may comprise one or more telescopic members arranged to be driven by the wheel motor of one or more of the at least one drive unit in order to selectively increase or decrease the footprint of the AGV. In this way, the stability of the AGV can be selectively increased, e.g. for carrying large loads, and selectively decreased, e.g. for navigating the AGV through narrow passages. In case the actuation member is arranged to be driven by the wheel motor of one or more of the at least one drive unit, the actuation member can be driven in the additional degree of freedom during navigation of the AGV.

As a further example, the support structure may comprise two rotationally coupled elongated members, for example arranged in an X-shape. In this case, the AGV may comprise four drive units, where one drive unit is connected to an end of each elongated member. The two elongated members may be rotationally coupled by means of a joint at a central portion of each elongated member. In this case, the joint constitutes an additional degree of freedom. The joint can be driven by the wheel motor of one or more of the at least one drive unit in order to selectively increase or decrease the footprint of the AGV, e.g. to widen or make more narrow the X-shape. The additional degree of freedom may be a translational degree of freedom. In this case, the actuation member may for example be a pillar, a telescopic member, a linear guide or other translationally movable device. Alternatively, the additional degree of freedom may be a rotational degree of freedom. In this case, the actuation member may for example be a joint, a rotatable support body or other rotatable body. A movement of the actuation member in the rotational degree of freedom, i.e. a rotation of the actuation member, may be a rotation about an axis other than the wheel axis and the steering axis.

The actuation member may be a rotatable support body arranged to be rotated relative to the support structure. The support body may be horizontally oriented and provide a support surface for a payload. The support body may for example be configured to support an industrial robot. The steering motor of the one or more drive units may be used to rotate the support body. The steering motor of another drive unit may be used to lift the support body, e.g. by means of an actuation member in the form of a lifting mechanism.

According to a further aspect, there is provided a method of controlling an AGV, the AGV comprising a support structure having an actuation member; and first and second drive units connected to the support structure, each drive unit comprising a wheel rotatable about a wheel axis and about a steering axis perpendicular to the wheel axis, the wheel axis providing a first degree of freedom for the drive unit and the steering axis providing a second degree of freedom for the drive unit; a wheel motor arranged to drive the wheel about the wheel axis; and a steering motor arranged to drive the wheel about the steering axis; wherein the actuation member is movable in an additional degree of freedom; and wherein the method comprises driving the wheel of the first drive unit about the wheel axis such that the first drive unit moves relative to the second drive unit, and such that the actuation member moves in the additional degree of freedom. The additional degree of freedom may be a translational degree of freedom.

BRIEF DESCRIPTION OF THE DRAWINGS

Further details, advantages and aspects of the present disclosure will become apparent from the following embodiments taken in conjunction with the drawings, wherein:

FIG. 3b: schematically represents a side view of the AGV in FIG. 3a;

FIG. 4b: schematically represents a side view of the AGV in FIG. 4a;

FIG. 5b: schematically represents a side view of the AGV and the industrial robot in FIG. 5a;

DETAILED DESCRIPTION

Figure 1:
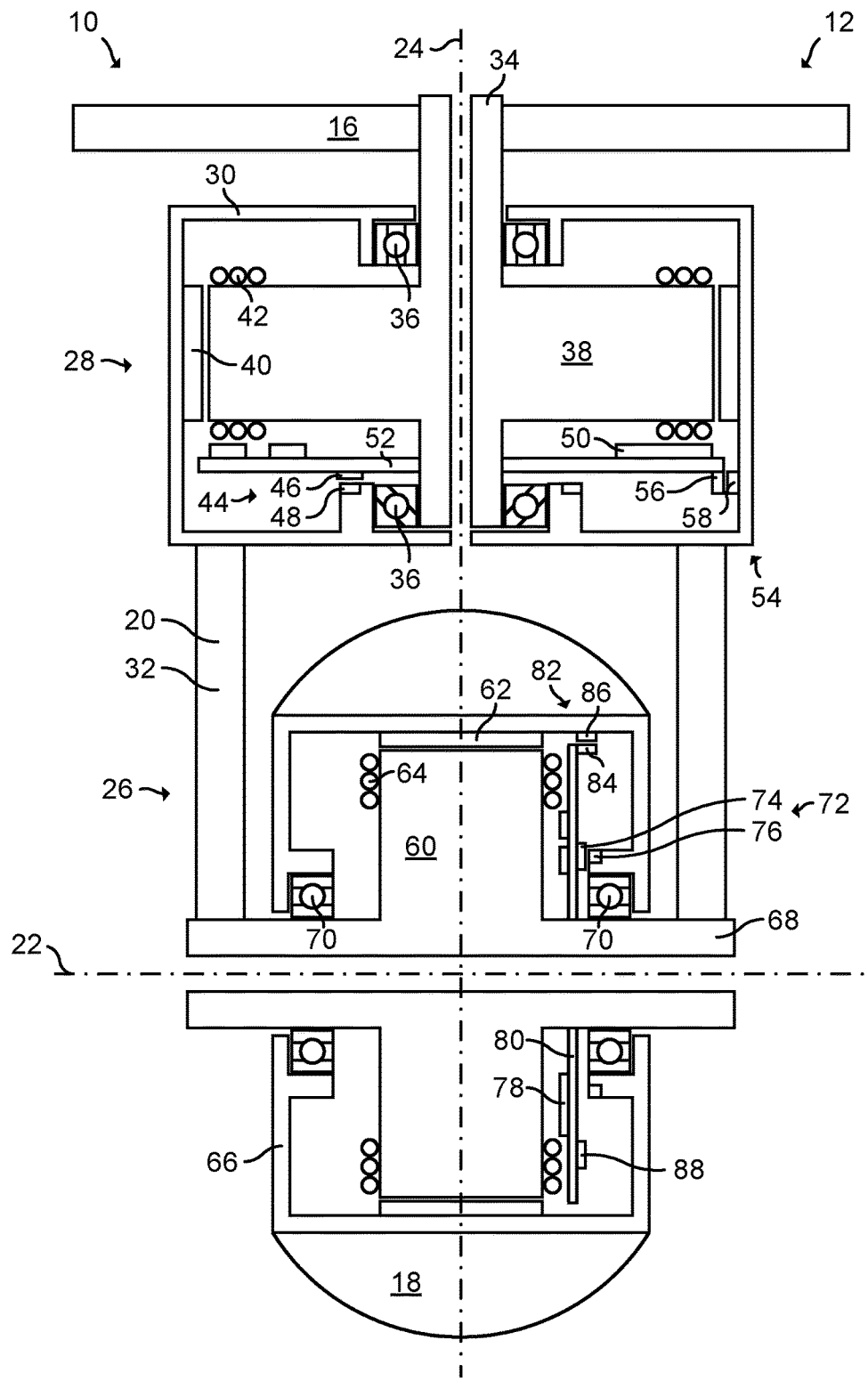
FIG. 1: schematically represents a cross-sectional side view of a drive unit.

In the following, an AGV and a method of controlling an automated vehicle, will be described. The same or similar reference numerals will be used to denote the same or similar structural features.

FIG. 1 schematically represents a cross-sectional view of one example of a drive unit 10 for an automated guided vehicle (AGV) 12. The AGV 12 is only partially illustrated in FIG. 1. The AGV 12 comprises a support structure 16 (only partly illustrated) and a plurality of drive units 10 (only one is shown in FIG. 1) connected to the support structure 16.

Figure 2:
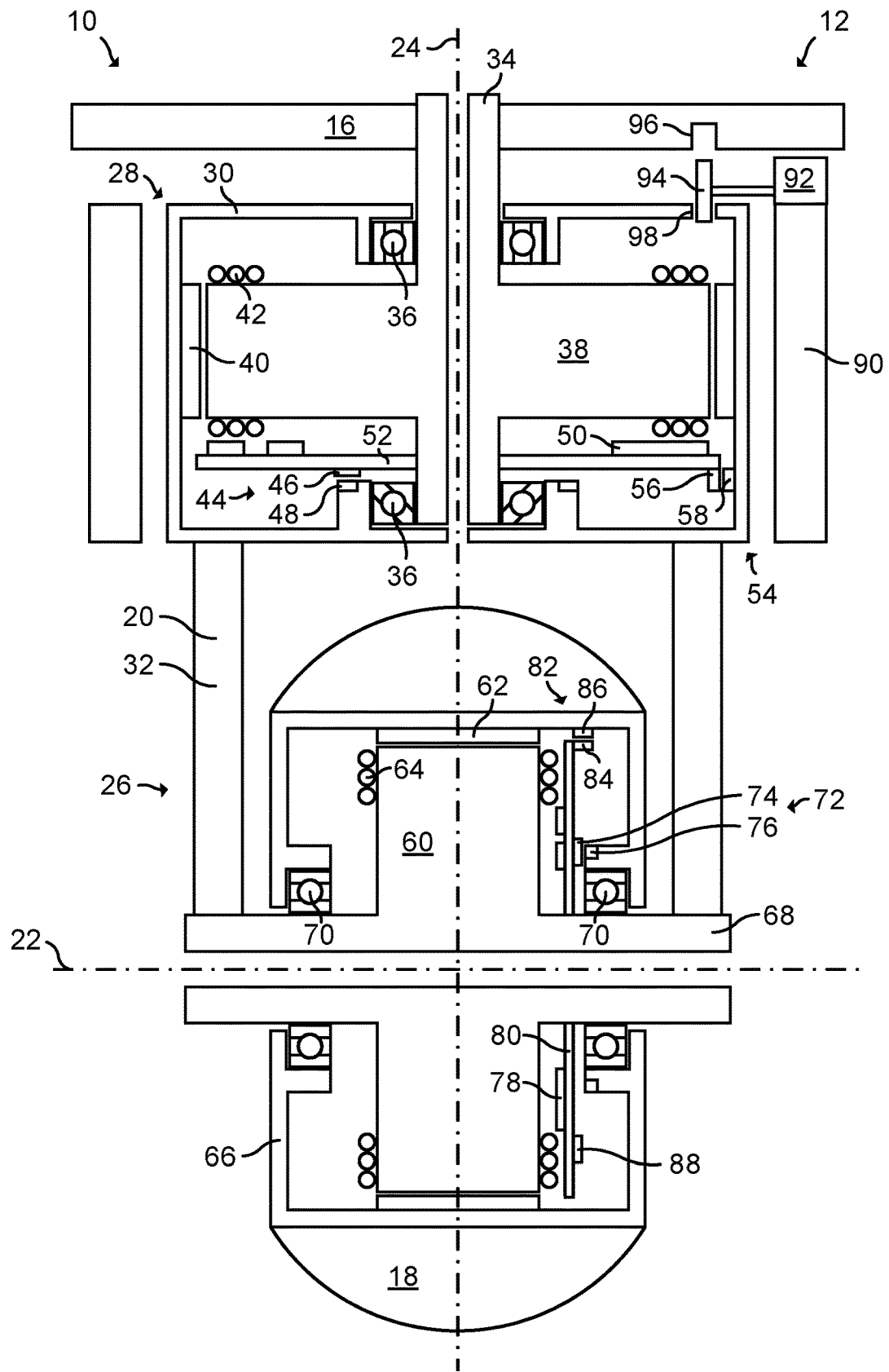
FIG. 2: schematically represents a cross-sectional side view of a further drive unit.

The drive unit 10 comprises a wheel 18 and a driven steering member 20. The wheel 18 is rotatable about a wheel axis 22. The driven steering member 20 and the wheel 18 are rotatable about a steering axis 24. The wheel axis 22 is perpendicular to the steering axis 24. Moreover, the wheel axis 22 intersects the steering axis 24. In FIG. 2, the wheel axis 22 is horizontal and the steering axis 24 is vertical. The wheel axis 22 provides a first degree of freedom for the drive unit 10. The steering axis 24 provides a second degree of freedom for the drive unit 10. The first degree of freedom and the second degree of freedom according to the present disclosure refer to degrees of freedom of individual kinematic pairs, and not degrees of freedom of the AGV 12.

The drive unit 10 further comprises an electric synchronous wheel motor 26. The wheel motor 26 is arranged to rotationally drive the wheel 18 about the wheel axis 22. In this example, the wheel motor 26 is arranged to directly drive the wheel 18, i.e. without any intermediate gearing between the wheel motor 26 and the wheel 18. The wheel motor 26 is arranged inside the wheel 18.

The drive unit 10 further comprises an electric synchronous steering motor 28. The steering motor 28 is arranged to rotationally drive the driven steering member 20 about the steering axis 24. The steering motor 28 and the wheel motor 26 may for example each provide a torque of at least 5 Nm.

The steering motor 28 is arranged to directly drive the driven steering member 20, i.e. without any intermediate gearing between the steering motor 28 and the driven steering member 20. The driven steering member 20 of the example in FIG. 2 comprises a base part 30 and two arm parts 32 extending downwards from the base part 30. The steering motor 28 of this example is arranged inside the base part 30. The base part 30 of this example is cylindrical. A belt (described below) can be wound around the base part 30.

The drive unit 10 further comprises a steering shaft 34 and two steering bearings 36 for rotationally supporting the driven steering member 20 about the steering axis 24. The steering shaft 34 is rigidly connected to the support structure 16 of the AGV 12. The steering motor 28 comprises a steering stator 38, a steering rotor 40 and steering coils 42. The steering coils 42 are arranged on the steering stator 38. The steering rotor 40 is directly connected to the base part 30 and is an integral part of the driven steering member 20.

The drive unit 10 further comprises a steering sensor device 44. The steering sensor device 44 determines a rotational position of the driven steering member 20, and consequently also of the wheel 18, about the steering axis 24. The steering sensor device 44 comprises an active part, here constituted by a Hall effect steering sensor 46, and a passive part, here constituted by a multipole steering encoder ring 48. The steering encoder ring 48 may for example comprise 128 poles. The steering sensor device 44 thereby constitutes a relatively cheap high-resolution encoder for accurate determination of a rotational position of the steering rotor 40, the driven steering member 20 and the wheel 18 about the steering axis 24.

The drive unit 10 further comprises steering drive electronics 50. The steering drive electronics 50 controls the operation of the steering motor 28, for example by means of PWM control. The drive unit 10 further comprises a steering circuit board 52. The Hall effect steering sensor 46 and the steering drive electronics 50 are provided on the steering circuit board 52. The steering encoder ring 48 is connected to the driven steering member 20.

The drive unit 10 further comprises a steering homing switch 54 for homing the steering motor 28. The steering homing switch 54 comprises a steering homing sensor 56 and a steering homing magnet 58. The steering homing sensor 56 is provided on the steering circuit board 52. The steering homing magnet 58 is provided on the base part 30.

The wheel motor 26 comprises a wheel stator 60, a wheel rotor 62 and wheel coils 64. The wheel coils 64 are arranged on the wheel stator 60. The wheel 18 comprises a hub 66. The wheel rotor 62 is directly connected to the hub 66 and is an integral part of the hub 66. The drive unit 10 further comprises a wheel shaft 68 and two-wheel bearings 70 for rotationally supporting the wheel 18 about the wheel axis 22. The wheel shaft 68 is rigidly connected to the arm parts 32 of the driven steering member 20.

The drive unit 10 further comprises a wheel sensor device 72. The wheel sensor device 72 may be of the same type as the steering sensor device 44. The wheel sensor device 72 determines a rotational position of the wheel 18 about the wheel axis 22. The wheel sensor device 72 comprises an active part, here constituted by a Hall effect wheel sensor 74, and a passive part, here constituted by a multipole wheel encoder ring 76. The wheel encoder ring 76 may for example comprise 128 poles. The wheel sensor device 72 thereby constitutes a relatively cheap high-resolution encoder for accurate determination of a rotational position of the wheel rotor 62 and the wheel 18 about the wheel axis 22.

The drive unit 10 further comprises wheel drive electronics 78. The wheel drive electronics 78 controls the operation of the wheel motor 26, for example by means of PWM control. The drive unit 10 further comprises a wheel circuit board 80. The Hall effect wheel sensor 74 and the wheel drive electronics 78 are provided on the wheel circuit board 80. The wheel encoder ring 76 is connected to the hub 66.

The drive unit 10 further comprises a wheel homing switch 82 for homing the wheel motor 26. The wheel homing switch 82 comprises a wheel homing sensor 84 and a wheel homing magnet 86. The wheel homing sensor 84 is provided on the wheel circuit board 80. The wheel homing magnet 86 is provided on the hub 66.

The drive unit 10 further comprises an accelerometer 88. The accelerometer 88 determines acceleration of the wheel 18. The accelerometer 88 may for example be a low cost micromachined microelectromechanical systems (MEMS) accelerometer. In this example, the accelerometer 88 is provided on the wheel circuit board 80. The accelerometer 88 may however be positioned elsewhere in the drive unit 10.

FIG. 2 schematically represents a cross-sectional side view of an alternative drive unit 10. Mainly differences with respect to FIG. 1 will be described. The drive unit 10 in FIG. 2 further comprises an additional driven member 90. A belt (described below) can be wound around the additional driven member 90. The additional driven member 90 is here exemplified as a cylindrical shell enclosing the base part 30. The drive unit 10 further comprises a steering clutch 92. The steering clutch 92 comprises a blocking element 94. The steering clutch 92 further comprises an electromagnetic actuator (not shown) for moving the blocking element 94.

A first opening 96 is provided in the support structure 16. A second opening 98 is provided in the base part 30. The steering clutch 92 is arranged to move the blocking element 94 into the second opening 98, as illustrated in FIG. 2. The steering clutch 92 is also arranged to move the blocking element 94 into the first opening 96.

In a first blocking position when the blocking element 94 engages the first opening 96, the additional driven member 90 is locked relative to the support structure 16. In the first blocking position of the steering clutch 92, the driven steering member 20 can be rotated relative to the additional driven member 90.

In a second blocking position (as illustrated in FIG. 2), when the blocking element 94 engages the second opening 98, the additional driven member 90 is locked relative to the driven steering member 20. In the second blocking position of the steering clutch 92, the additional driven member 90 can be rotated together with the driven steering member 20 and relative to the support structure 16. In this example, the driven steering member 20 and the wheel 18 are always rotated when the steering motor 28 rotates, regardless of the position of the steering clutch 92.

In FIG. 2, the steering clutch 92 is connected to the additional driven member 90. Furthermore, the steering clutch 92 is an interference clutch. The use of a relatively cheap interference clutch is enabled due to the possibility to accurately position the driven steering member 20 (and the wheel 18) about the steering axis 24. The steering clutch 92 and the additional driven member 90 according to FIG. 2 are optional.

Figure 3A:
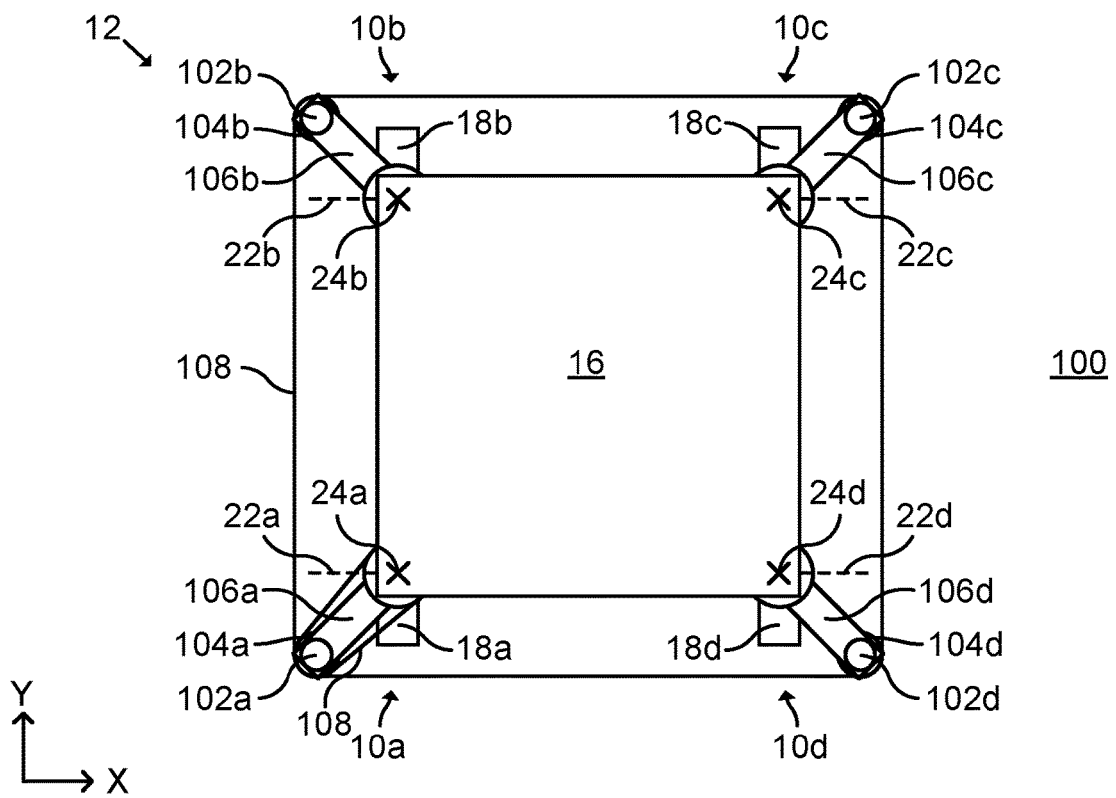
FIG. 3a: schematically represents a top view of an AGV comprising a plurality of drive units.
Figure 3B:
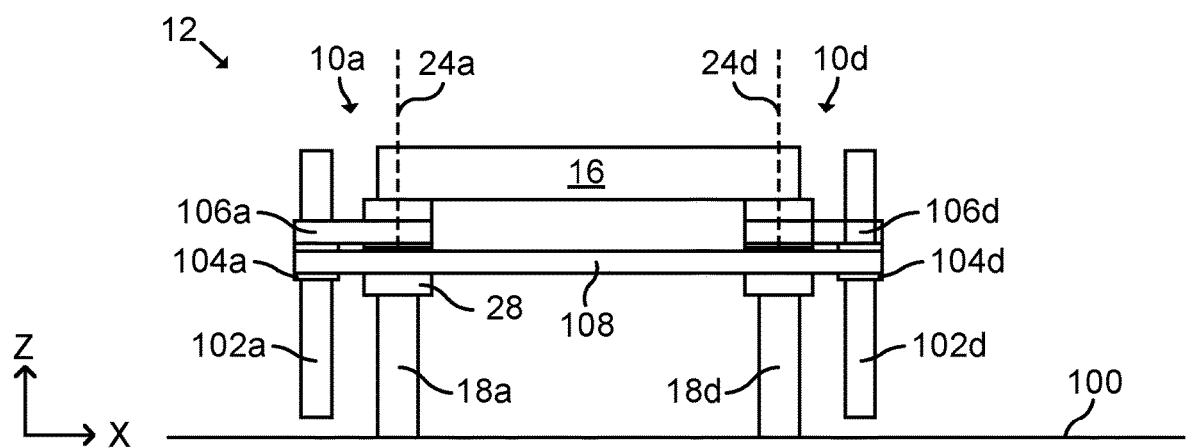

FIG. 3a schematically represents a top view of an AGV 12 comprising a support structure 16 and a plurality of drive units 10a-10d. FIG. 3b schematically represents a side view of the AGV 12 in FIG. 3a. With collective reference to FIGS. 3a and 3b, the AGV 12 comprises four drive units 10a-10d and consequently four wheels 18a-18d. Each drive unit 10a-10d is of the type illustrated in FIG. 1. The AGV 12 may however comprise fewer than four drive units 10 or more than four drive units 10.

In FIG. 3a, each drive unit 10 is connected to a corner of the support structure 16. The support structure 16 is here exemplified as a platform. The drive units 10a-10d are placed in a square.

The wheels 18a-18d are traction wheels for driving the AGV 12 on a surface, such as a horizontal floor 100. FIGS. 3a and 3b further show a Cartesian coordinate system X, Y, Z for reference purposes. The floor 100 is arranged in the XY-plane.

The AGV 12 further comprises a central control system (not shown). The central control system is provided in the support structure 16. The central control system is in signal communication with each drive unit 10a-10d via controller area network (CAN) buses (not shown). The central control system may also comprise a battery for powering each drive unit 10a-10d.

The AGV 12 further comprises four pillars 102a-102d. Each pillar 102a-102d is an example of an actuation member. Each pillar 102a-102d is vertically oriented. In FIGS. 3a and 3b, each pillar 102a-102d is arranged adjacent to an associated drive unit 10a-10d. The pillars 102a-102d are arranged to raise and lower the support structure 16 and the wheels 18a-18d relative to the floor 100. In FIGS. 3a and 3b, the pillars 102a-102d are for example 30 mm above the floor 100.

The AGV 12 further comprises four threaded sleeves 104a-104d. Each sleeve 104a-104d encloses and threadingly engages an associated pillar 102a-102d.

The AGV 12 further comprises four arms 106a-106d. The arms 106a-106d are rigidly connected to the support structure 16. Each arm 106a-106d vertically holds an associated sleeve 104a-104d. Each sleeve 104a-104d is rotationally coupled to an associated arm 106a-106d and is thereby allowed to rotate (in the XY-plane) relative to the associated arm 106a-106d.

The AGV 12 further comprises a continuous belt 108. The belt 108 is wound around all four sleeves 104a-104d. The belt 108 is also wound around the steering motor 28 of the first drive unit 10a. More specifically, the belt 108 is wound around the base part 30 of the driven steering member 20 of the first drive unit 10a. The belt 108 and the sleeves 104a-104d form one of many types of a transmission for transmitting a rotation of the steering motor 28 of the first drive unit 10a to a movement of the pillars 102a-102d.

In FIG. 3a, the AGV 12 is at standstill. At standstill of the AGV 12, the steering motor 28 of each wheel 18a-18d can drive the respective wheel 18a-18d to rotate about the respective steering axis 24a-24d.

Figure 3C:
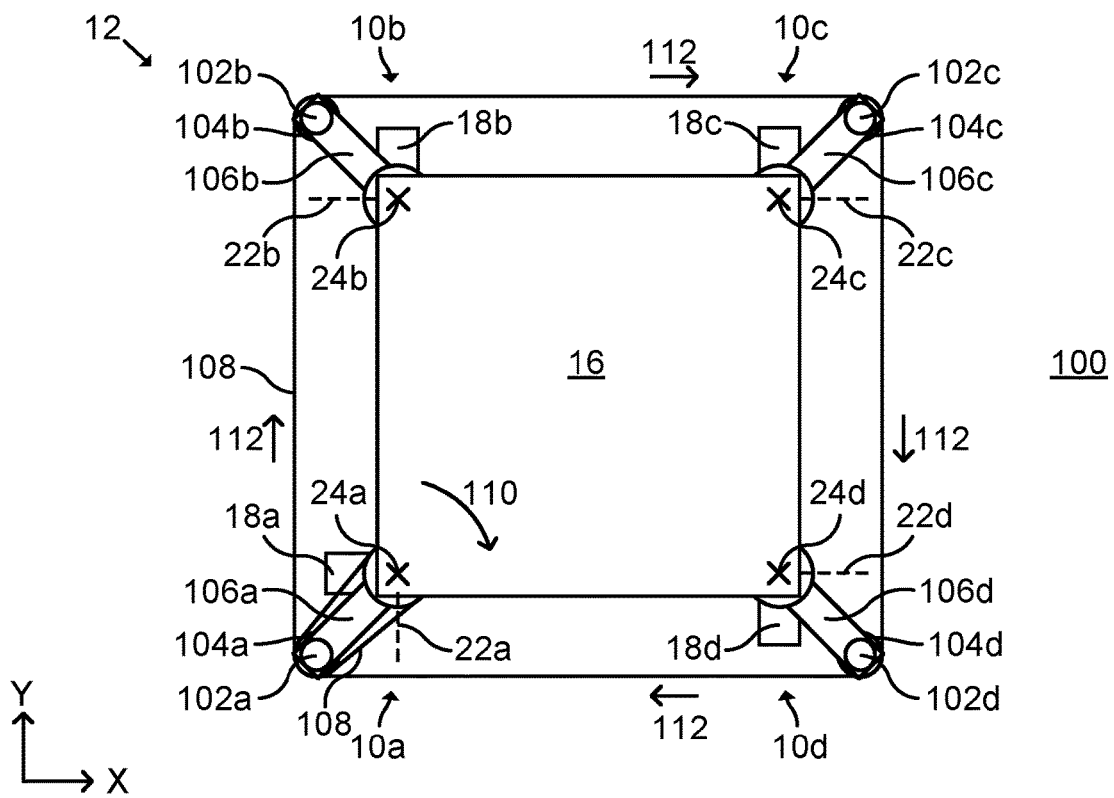
FIG. 3c: schematically represents a top view of the AGV during movement of actuation members.
Figure 3D:
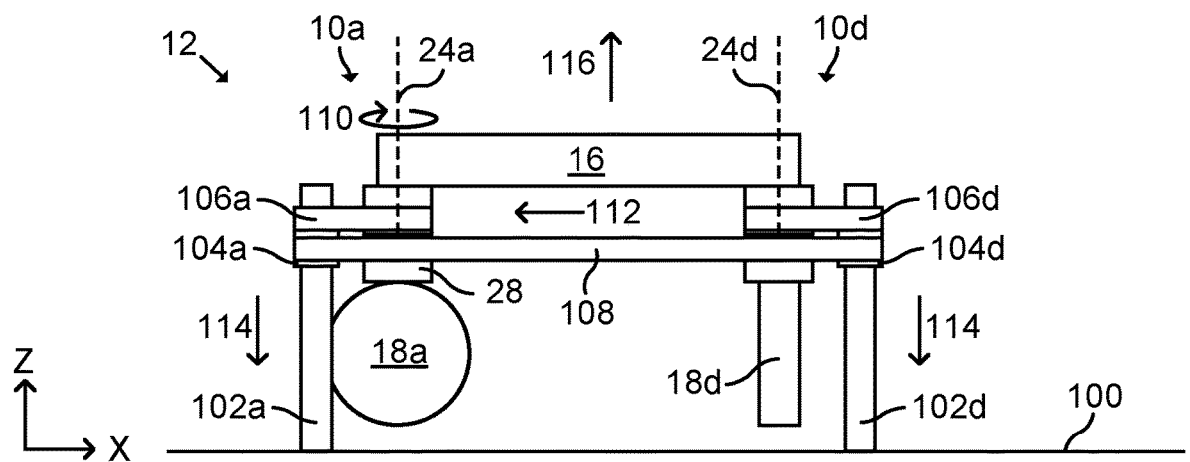
FIG. 3d: schematically represents a side view of the AGV during movement of the actuation members.

FIG. 3c schematically represents a top view of the AGV 12 during movement of the pillars 102a-102d. FIG. 3d schematically represents a side view of the AGV 12 during movement of the pillars 102a-102d. With collective reference to FIGS. 3c and 3d, a method of driving the pillars 102a-102d will be described.

The steering motor 28 of the first drive unit 10a drives the first wheel 18a to rotate about the first steering axis 24a, as illustrated with arrow 110. The steering motors 28 of each of the second drive unit 10b, of the third drive unit 10c and of the fourth drive unit 10d are kept still, unless used to drive one or more further actuation members (for example according to FIGS. 5a-5d).

As the first steering motor 28 rotates, the belt 108 is driven by the engagement with the base part 30 of the first drive unit 10a. The movement of the belt 108 is illustrated with arrow 112. The belt 108 drives the sleeves 104a-104d to rotate. As the sleeves 104a-104d rotate, the threaded engagements between the sleeves 104a-104d and the pillars 102a-102d cause each pillar 102a-102d to move downwards, as indicated with arrow 114. Arrow 114 thus represents an additional translational degree of freedom, i.e. a degree of freedom in addition to the wheel axes 22 and the steering axes 24 of the drive units 10. When the pillars 102a-102d contact the floor 100, further downward movement of the pillars 102a-102d cause the support structure 16 to be raised and the wheels 18a-18d to be lifted from the floor 100, as indicated with arrow 116. The steering motor 28 of the first drive unit 10a is thus utilized to actuate an additional axis.

In FIGS. 3c and 3d, the wheels 18a-18d are for example 30 mm above the floor 100. The supporting of the AGV 12 by means of the pillars 102a-102d increases the stability of the AGV 12. The steering motor 28 of the first drive unit 10a may then be rotated in the opposite direction to lower the support structure 16 and the wheels 18a-18d and to raise the pillars 102a-102d from the floor 100. When the pillars 102a-102d are raised, the AGV 12 can be driven to another location.

In the example in FIGS. 3a-3d, the pillars 102a-102d are always driven in the additional degree of freedom when the steering motor 28 of the first drive unit 10a is driven. Thus, the base part 30 of the first drive unit 10a is permanently coupled to the pillars 102a-102d.

The positions of the pillars 102a-102d above the floor 100 may be taken into account when driving the AGV 12. For example, in case the navigation of the AGV 12 comprises a plurality of consecutive rotations in the same direction of the steering motor 28 of the first drive unit 10a, the pillars 102a-102d may be lowered too close to the floor 100. In this case, the AGV 12 may be temporarily stopped and the steering motor 28 of the first drive unit 10a may be rotated backwards such that the pillars 102a-102d are lifted from the floor 100. The navigation of the AGV 12 may then be resumed.

However, in many navigation sequences of the AGV 12, the steering motors 28 are only operated within an angular range within 360 degrees, such as within 180 degrees. Such navigation sequences do not have to be interrupted for lifting (or lowering) the pillars 102a-102d. That is, during such navigation sequences, the pillars 102a-102d can be kept in an inactive range above the floor 100.

Alternatively, if a drive unit 10 comprising a steering clutch 92 according to FIG. 2 is employed, the first steering motor 28 is first positioned such that the steering clutch 92 can be moved to the second blocking position, i.e. such that the second opening 98 is aligned with the blocking element 94 of the steering clutch 92 (see FIG. 2). The steering clutch 92 is then activated by moving the blocking element 94 to the second blocking position. The belt 108 is then driven by the steering motor 28 via engagement with the additional driven member 90. The steering clutch 92 may then be deactivated by moving the blocking element 94 to the first blocking position before the AGV 12 is driven to another location. The steering clutch 92 is however not needed for driving the pillars 102a-102d.

Figure 4A:
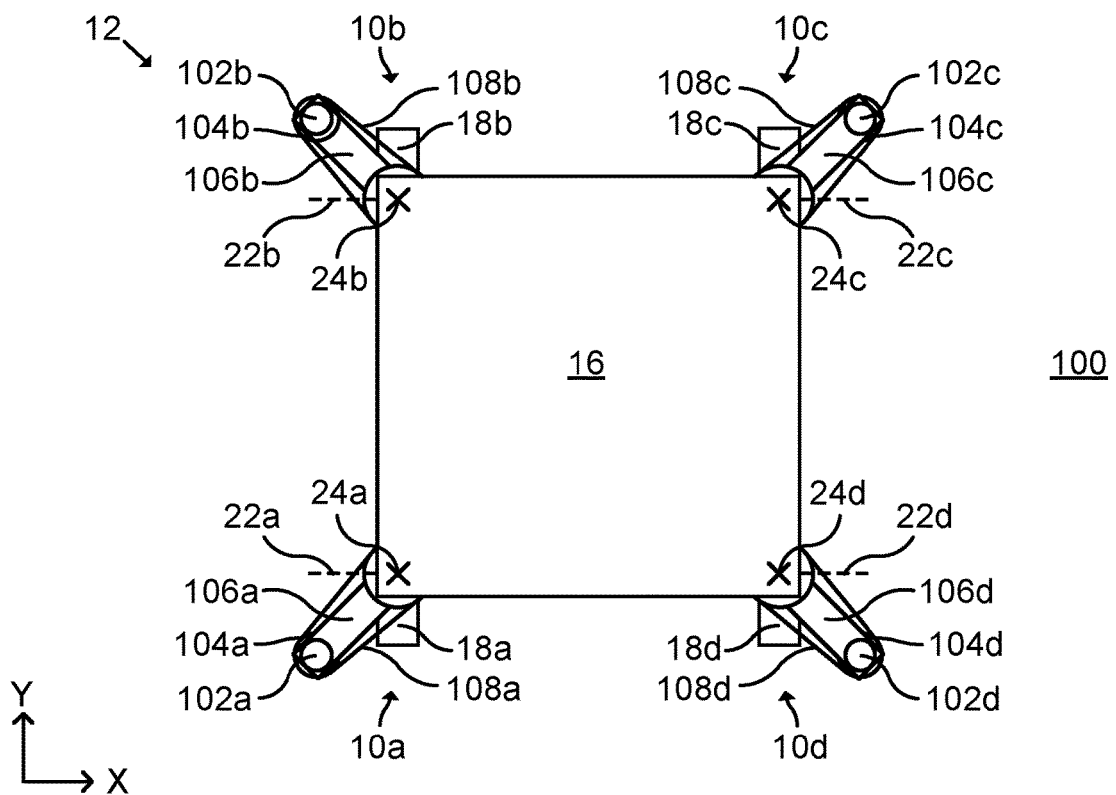
FIG. 4a: schematically represents a top view of a further AGV comprising a plurality of drive units.
Figure 4B:
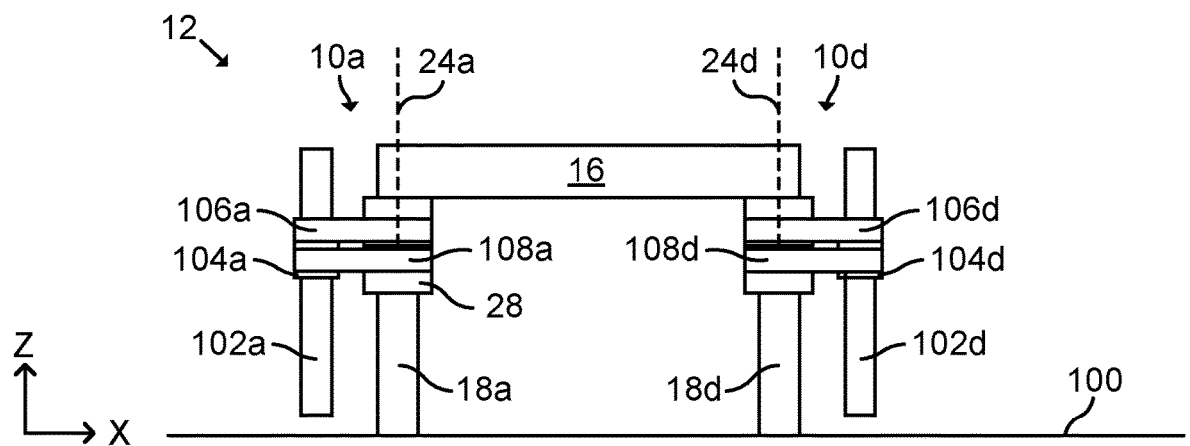

FIG. 4a schematically represents a top view of a further AGV 12 comprising a plurality of drive units 10. FIG. 4b schematically represents a side view of the AGV 12 in FIG. 4a. With collective reference to FIGS. 4a and 4b, mainly differences with respect to FIGS. 3a-3d will be described.

In FIGS. 4a and 4b, the AGV 12 is at standstill. The AGV 12 comprises four belts 108a-108d. One belt 108a-108d is associated with each drive unit 10a-10d. A first belt 108a is wound around the base part 30 of the steering motor 28 of the first drive unit 10a and around the first sleeve 104a. A second belt 108b is wound around the base part 30 of the steering motor 28 of the second drive unit 10b and around the second sleeve 104b. A third belt 108c is wound around the base part 30 of the steering motor 28 of the third drive unit 10c and around the third sleeve 104c. A fourth belt 108d is wound around the base part 30 of the steering motor 28 of the fourth drive unit 10d and around the fourth sleeve 104d.

The belts 108a-108d and the sleeves 104a-104d thus form four independent transmissions, each for transmitting a rotation of the steering motor 28 of a drive unit 10a-10d to a movement of an associated pillar 102a-102d.

Figure 4C:
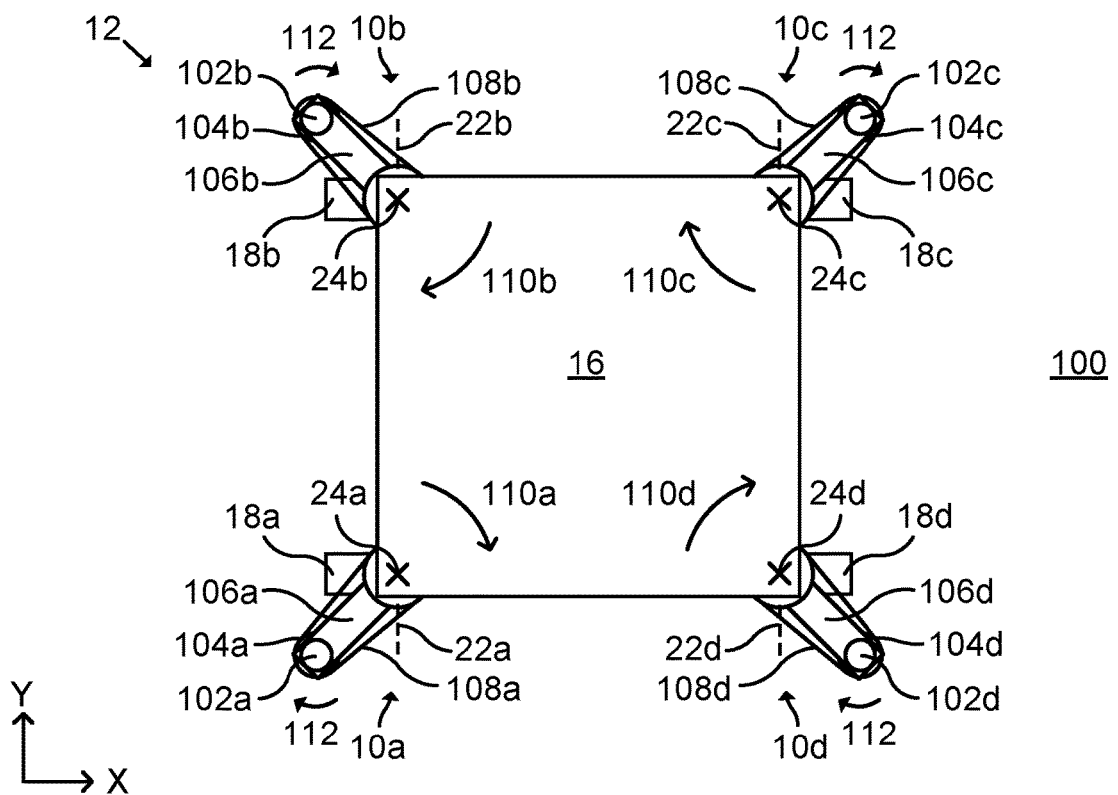
FIG. 4c: schematically represents a top view of the AGV in FIGS. 4a and 4b during movement of actuation members.
Figure 4D:
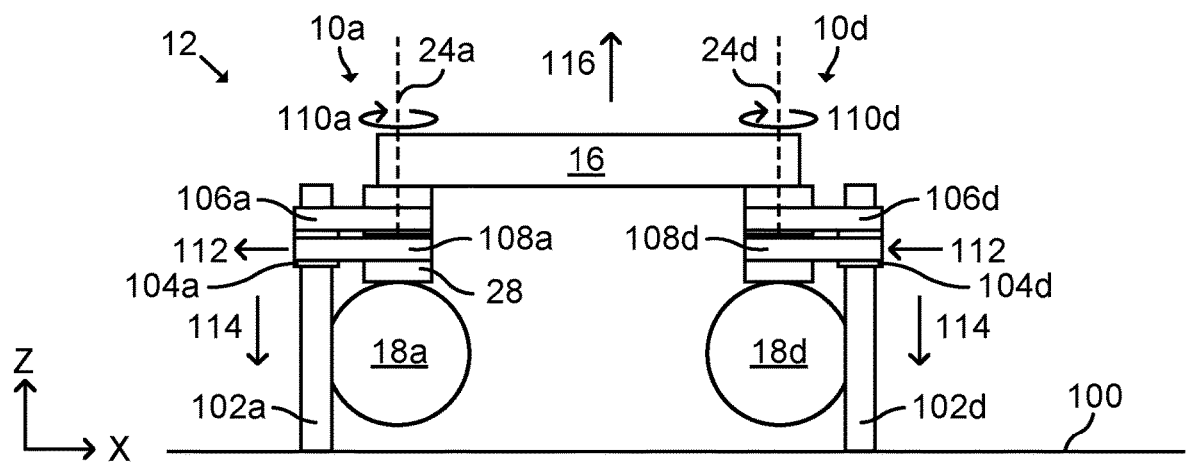
FIG. 4d: schematically represents a side view of the AGV in FIGS. 4a and 4b during movement of the actuation members.

FIG. 4c schematically represents a top view of the AGV 12 in FIGS. 4a and 4b during movement of the pillars 102a-102d. FIG. 4d schematically represents a side view of the AGV 12 during movement of the pillars 102a-102d. With collective reference to FIGS. 4c and 4d, a method of driving the pillars 102a-102d will be described, mainly with differences from the method in FIGS. 3c and 3d.

The steering motor 28 of the first drive unit 10a drives the first wheel 18a to rotate about the first steering axis 24a, as illustrated with arrow 110a. The steering motor 28 of the second drive unit 10b drives the second wheel 18b to rotate about the second steering axis 24b, as illustrated with arrow 110b. The steering motor 28 of the third drive unit 10c drives the third wheel 18c to rotate about the third steering axis 24c, as illustrated with arrow 110c. The steering motor 28 of the fourth drive unit 10d drives the fourth wheel 18d to rotate about the fourth steering axis 24d, as illustrated with arrow 110d. In this example, the four wheels 18a-18d are rotated with the same speed to generate a synchronized movement of the pillars 102a-102d. During the rotations of the wheels 18a-18d, each of the four belts 108a-108d is driven by the respective steering motors 28. Each belt 108a-108d drives the associated sleeve 104a-104d to rotate and thereby causes the pillars 102a-102d to move downwards, as illustrated with arrows 114. The AGV 12 in FIGS. 4a-4d can for example be used to raise and position the support structure 16 horizontally from an inclined floor 100.

Figure 5A:
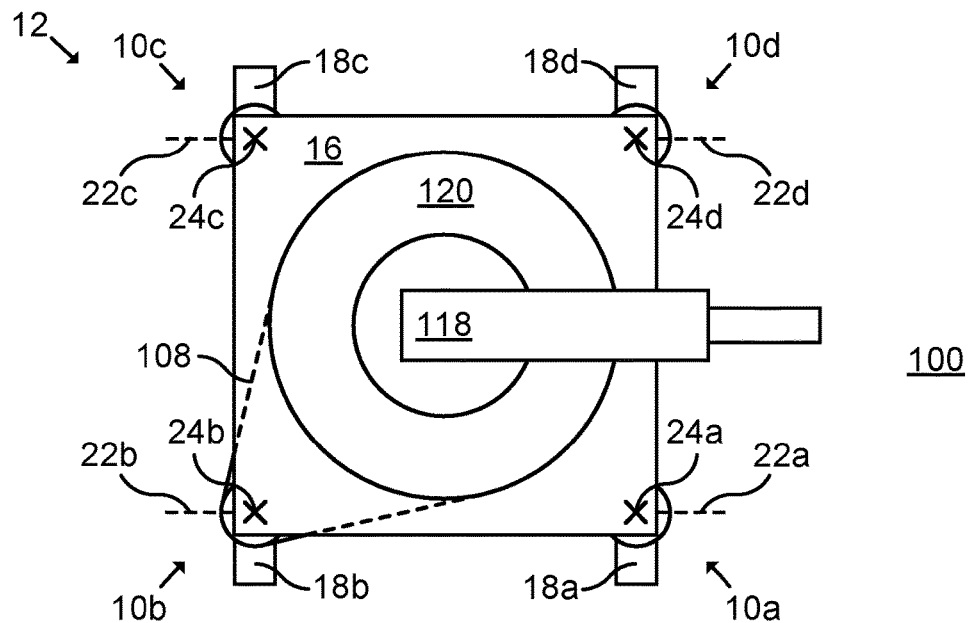
FIG. 5a: schematically represents a top view of a further AGV comprising a plurality of drive units and an industrial robot.
Figure 5B:
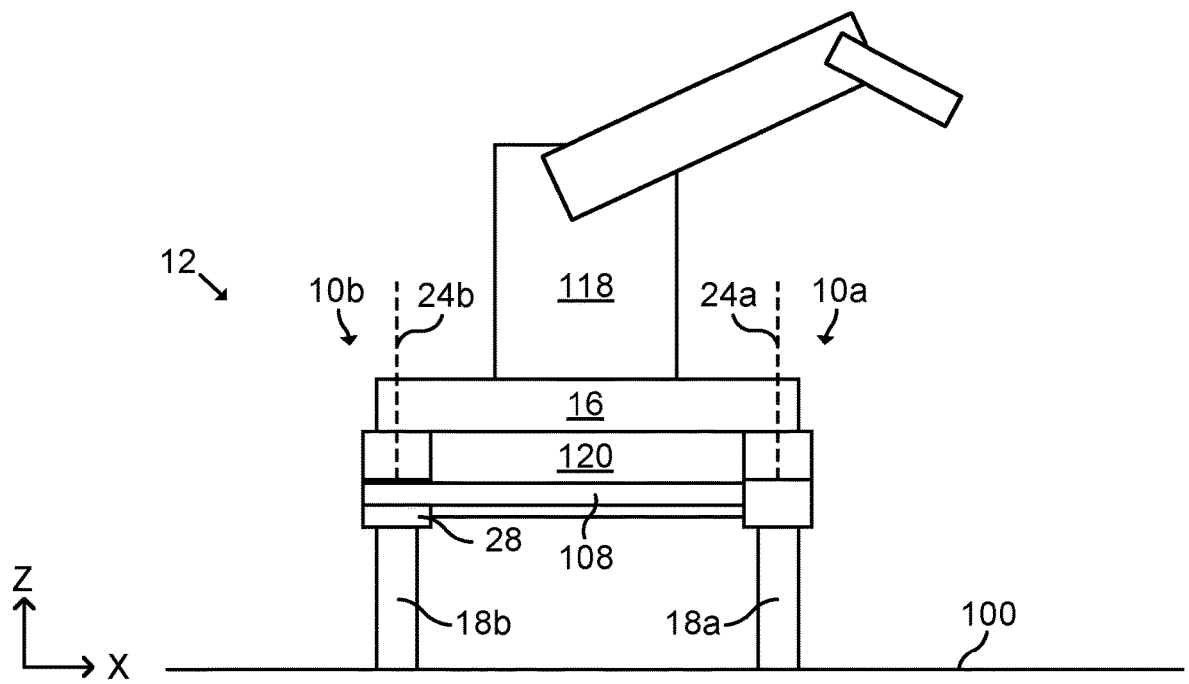

FIG. 5a schematically represents a top view of a further AGV 12 comprising a plurality of drive units 10 and an industrial robot 118. FIG. 5b schematically represents a side view of the AGV 12 and the robot 118 in FIG. 5a.

With collective reference to FIGS. 5a and 5b, the AGV 12 comprises a rotatable support body 120. The support body 120 is an example of an actuation member. The support body 120 is rotatably coupled to the support structure 16. The AGV 12 further comprises a continuous belt 108.

As shown in FIG. 5b, the support body 120 of this example extends below the support structure 16. The belt 108 is wound around the steering motor 28 of the second drive unit 10b and around the support body 120. More specifically, the belt 108 is wound around the base part 30 of the driven steering member 20 of the second drive unit 10b.

In FIGS. 5a and 5b, the AGV 12 is at standstill. The AGV 12 carries the robot 118 on the support body 120. The support body 120 provides a horizontal support surface for the robot 118. The robot 118 comprises a manipulator operable in three or more axes. The robot 118 may for example be a collaborative robot.

Figure 5C:
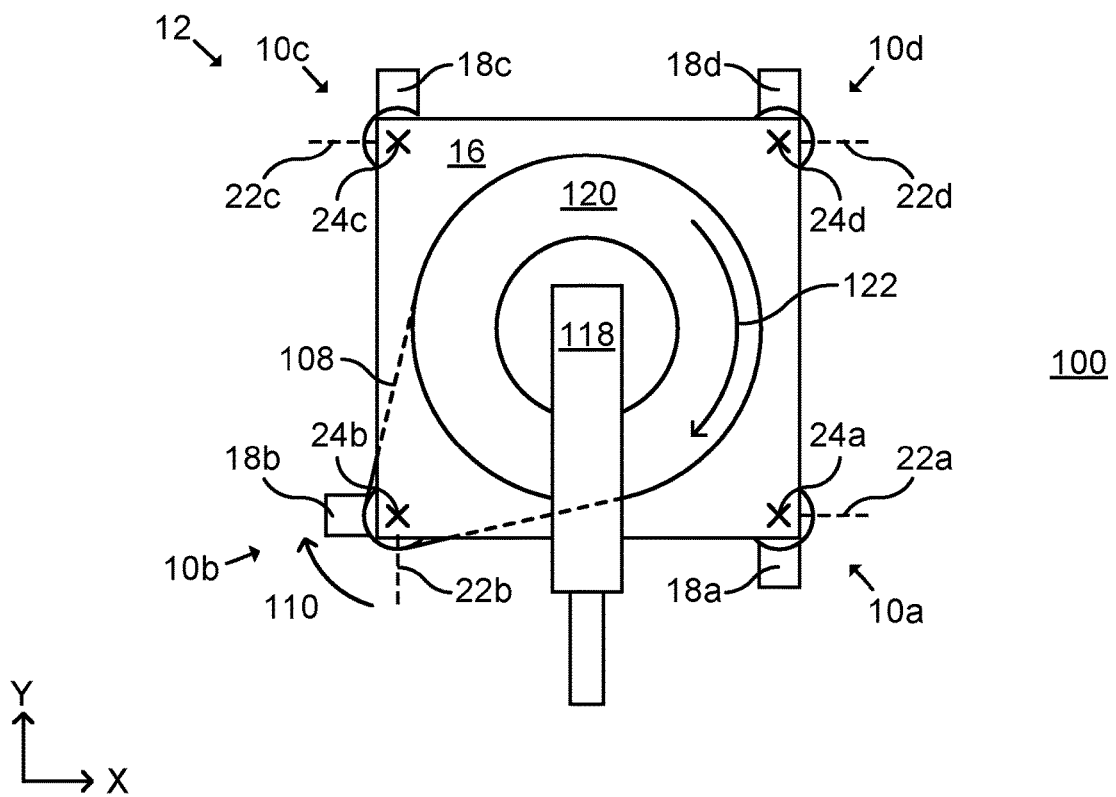
FIG. 5c: schematically represents a top view of the AGV and the industrial robot in FIGS. 5a and 5b during movement of an actuation member.
Figure 5D:
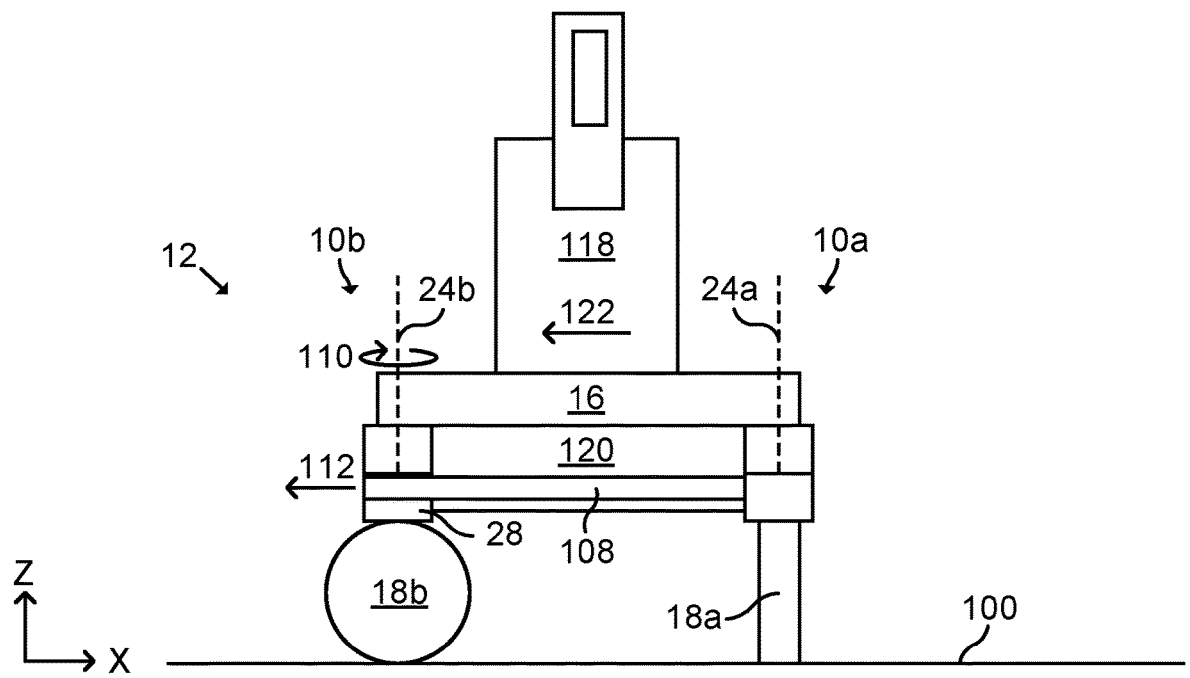
FIG. 5d: schematically represents a side view of the AGV and the industrial robot during movement of the actuation member.

FIG. 5c schematically represents a top view of the AGV 12 and the robot 118 in FIGS. 5a and 5b during movement of the support body 120. FIG. 5d schematically represents a side view of the AGV 12 and the robot 118 during movement of the support body 120. With collective reference to FIGS. 5c and 5d, a method of driving the support body 120 will be described.

The steering motor 28 of the second drive unit 10b drives the second wheel 18b to rotate about the second steering axis 24b, as illustrated with arrow 110. The steering motors 28 of the first drive unit 10a, the third drive unit 10c and the fourth drive unit 10d may be kept still and/or may drive further actuation members. In particular, the first drive unit 10a may be arranged to drive pillars 102a-102d as shown in FIGS. 3a-3d to raise the wheels 18a-18d and the support structure 16. Thus, the actuation members in the form of pillars 102a-102d in FIGS. 3a-3d can be combined with the actuation member in the form of the support body 120 in FIGS. 5a-5d.

The support structure 16 and the wheels 18a-18d can thereby be raised above the floor 100 before the second wheel 18b is rotated about the second steering axis 24b to drive the support body 120. Unnecessary wear on the wheels 18a-18d can thereby be avoided.

As the steering motor 28 of the second drive unit 10b rotates, the belt 108 is driven by the engagement with the base part 30 of the second drive unit 10b. The movement of the belt 108 is illustrated with arrow 112 in FIG. 5d. The belt 108 drives the support body 120 to rotate, as indicated with arrow 122. Arrow 122 thus represents an additional rotational degree of freedom, in addition to the two rotational degrees of freedom of each drive unit 10a-10d. The robot 118 on the support body 120 is thereby also rotated. The steering motor 28 of the second drive unit 10b is thus utilized to actuate an additional axis and to assist the robot 118 in carrying out a work function.

In the example in FIGS. 5a-5d, the support body 120 is always driven in the additional degree of freedom when the steering motor 28 of the second drive unit 10b is driven. Thus, the base part 30 of the second drive unit 10b is permanently coupled to the support body 120.

In case a drive unit 10 with a steering clutch 92 according to FIG. 2 is employed, the AGV 12 and the robot 118 may be moved simultaneously when carrying out a task by the robot 118. Thus, also the wheel motor 26 of one or more drive units 10a-10d may be used to assist operations of the robot 118.

Figure 6A:
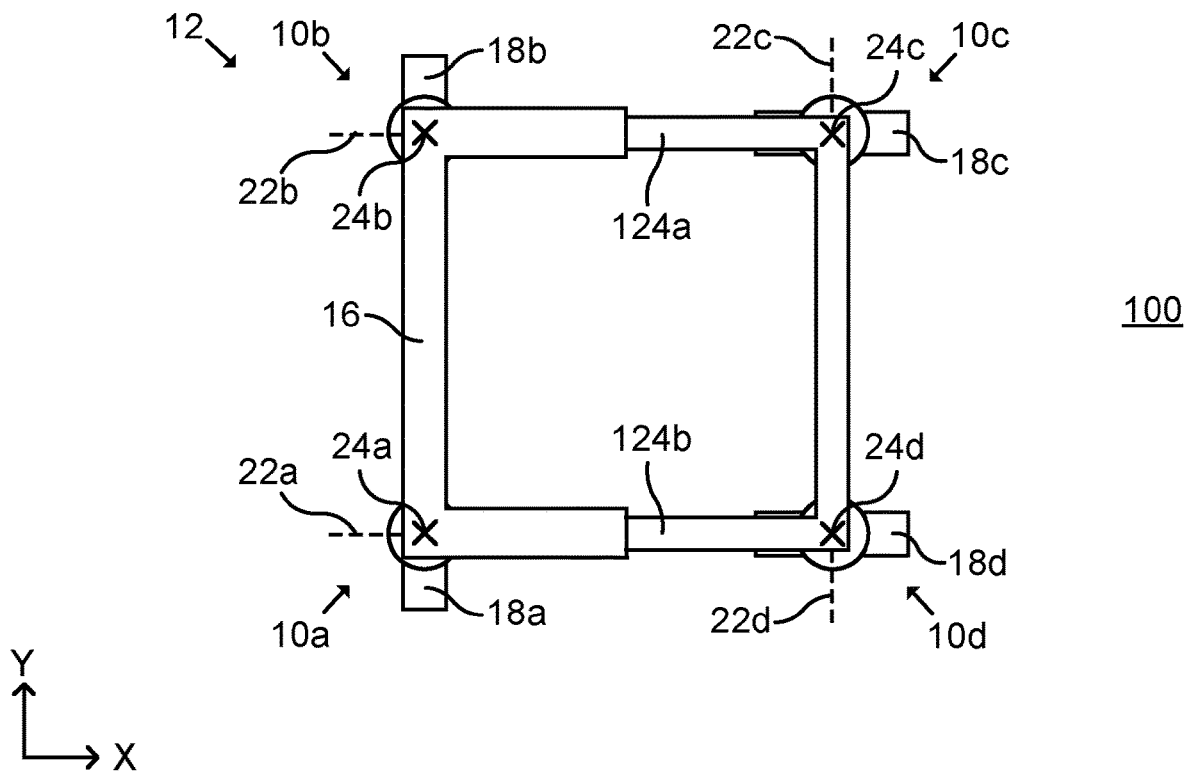
FIG. 6a: schematically represents a top view of a further AGV comprising a plurality of drive units.

FIG. 6a schematically represents a top view of a further AGV 12 comprising a plurality of drive units 10. In FIG. 6a, the AGV 12 comprises four drive units 10a-10d and consequently four wheels 18a-18d. Each drive unit 10a-10d is of the type illustrated in FIG. 1. The AGV 12 may however comprise fewer than four drive units 10 or more than four drive units 10.

In FIG. 6a, each drive unit 10 is connected to a corner of the support structure 16. The support structure 16 is here exemplified as a frame. The support structure 16 comprises a first telescopic member 124a and a second telescopic member 124b. The first telescopic member 124a and the second telescopic member 124b each constitutes an example of an actuation member. In FIG. 6a, the telescopic members 124a and 124b are horizontally oriented.

The first telescopic member 124a is arranged between the second drive unit 10b and the third drive unit 10c. The second telescopic member 124b is arranged between the first drive unit 10a and the fourth drive unit 10d. The AGV 12 may optionally comprise one or more actuation member clutches (not shown) for selectively locking the telescopic members 124a and 124b.

In FIG. 6a, the AGV 12 is at standstill. In order to extend the telescopic members 124a and 124b, the second wheel 18b may be oriented transverse to an extension direction of the first telescopic member 124a, the third wheel 18c may be oriented parallel with the extension direction of the first telescopic member 124a, the first wheel 18a may be oriented transverse to an extension direction of the second telescopic member 124b, and the fourth wheel 18d may be oriented parallel with the extension direction of the second telescopic member 124b. These positions of the wheels 18a-18d are illustrated in FIG. 6a.

After positioning the wheels 18a-18d according to FIG. 6a and releasing the one or more actuation member clutches, if any, the telescopic members 124a and 124b can be extended. The positioning of the wheels 18a-18d according to FIG. 6a is however optional. The telescopic members 124a and 124b may for example be extended (or retracted) also during navigation of the AGV 12.

Figure 6B:
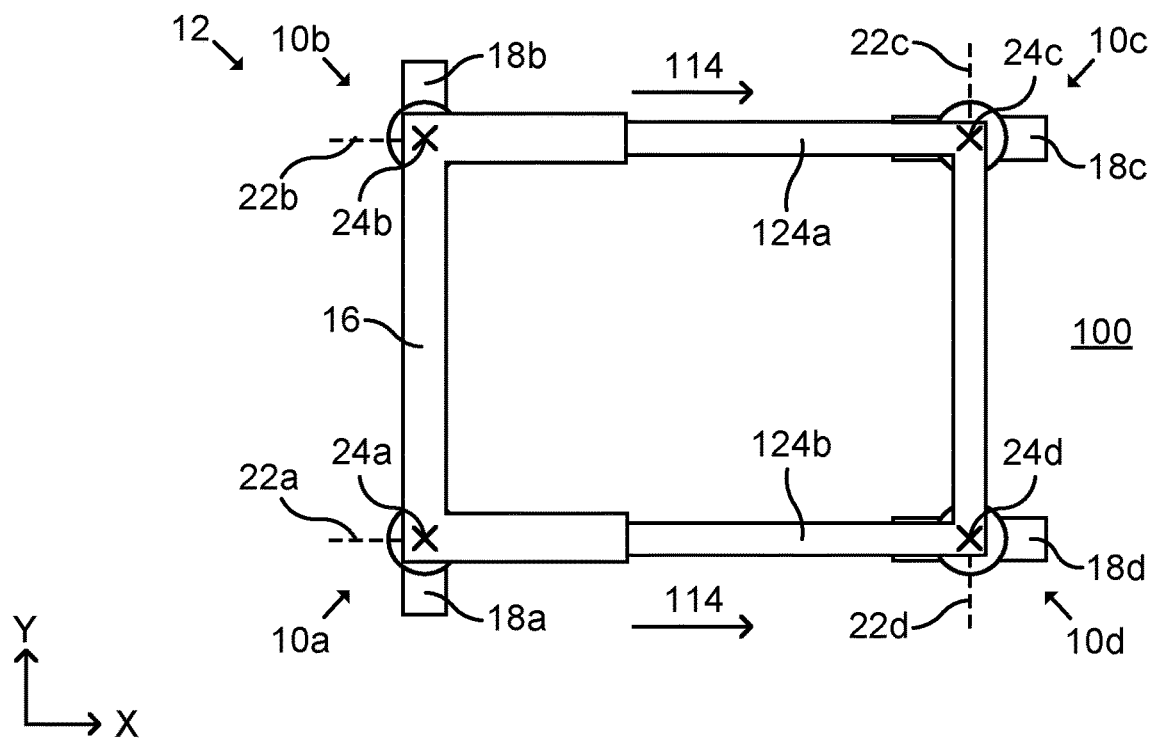
FIG. 6b: schematically represents a top view of the AGV in FIG. 6a during movement of actuation members.

FIG. 6b schematically represents a top view of the AGV 12 during movement of the telescopic members 124a and 124b. By driving the wheel motor 26 of the third drive unit 10c and the wheel motor 26 of the fourth drive unit 10d, while keeping the wheel motors 26 of the first drive unit 10a and the second drive unit 10b stationary, the third drive unit 10c moves relative to the second drive unit 10b to extend the first telescopic member 124a and the fourth drive unit 10d moves relative to the first drive unit 10a to extend the second telescopic member 124b. The wheel motors 26 of the third wheel 18c and the fourth wheel 18d may for example be position controlled until a desired length of the telescopic members 124a and 124b is reached. The transverse orientations of the first wheel 18a and the second wheel 18b provide counterforces against the extensions of the telescopic members 124a and 124b.

The extensions of the telescopic members 124a and 124b are illustrated with arrows 114. Arrows 114 thus represent an additional translational degree of freedom. As shown in FIG. 6b, the geometry of the support structure 16 has been changed. The method may then be reversed in order to retract the telescopic members 124a and 124b and decrease the footprint of the AGV 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An automated guided vehicle comprising a support structure and at least one drive unit connected to the support structure, wherein each drive unit comprises:
  a wheel rotatable about a wheel axis and about a steering axis perpendicular to the wheel axis, the wheel axis providing a first degree of freedom for the drive unit and the steering axis providing a second degree of freedom for the drive unit;
  a wheel motor arranged to drive the wheel about the wheel axis; and
  a steering motor arranged to drive the wheel about the steering axis;
  wherein the automated guided vehicle further includes at least one actuation member movable in an additional degree of freedom;
  wherein the at least one actuation member is arranged to be driven by the steering motor of at least one drive unit in the additional degree of freedom.

2. The automated guided vehicle according to claim 1, further comprising a steering clutch arranged to selectively couple the steering motor of one of the at least one drive unit to the actuation member.

3. The automated guided vehicle according to claim 2, wherein the actuation member is a pillar arranged to raise and lower the support structure.

4. The automated guided vehicle according to claim 2, wherein the actuation member is a telescopic member.

5. The automated guided vehicle according to claim 2, wherein the actuation member is arranged to be driven by the wheel motor of one or more of the at least one drive unit in the additional degree of freedom.

6. The automated guided vehicle according to claim 2, wherein the additional degree of freedom is a translational degree of freedom.

7. The automated guided vehicle according to claim 1, wherein the steering motor of one of the at least one drive unit is permanently coupled to the actuation member.

8. The automated guided vehicle according to claim 1, further comprising a transmission arranged to transmit a rotation of the steering motor of one or more of the at least one drive unit to a movement of the actuation member in the additional degree of freedom.

9. The automated guided vehicle according to claim 8, wherein the transmission comprises a belt.

10. The automated guided vehicle according to claim 1, wherein the actuation member is a pillar arranged to raise and lower the support structure.

11. The automated guided vehicle according to claim 1, wherein the actuation member is a telescopic member.

12. The automated guided vehicle according to claim 1, wherein the actuation member is arranged to be driven by the wheel motor of one or more of the at least one drive unit in the additional degree of freedom.

13. The automated guided vehicle according to claim 1, wherein the additional degree of freedom is a translational degree of freedom.

14. The automated guided vehicle according to claim 1, wherein the additional degree of freedom is a rotational degree of freedom.

15. The automated guided vehicle according to claim 14, wherein the actuation member is a rotatable support body arranged to be rotated relative to the support structure.

16. A method of controlling an automated guided vehicle, the automated guided vehicle comprising:

a support structure having an actuation member; and first and second drive units connected to the support structure, each drive unit including a wheel rotatable about a wheel axis and about a steering axis perpendicular to the wheel axis, the wheel axis providing a first degree of freedom for the drive unit and the steering axis providing a second degree of freedom for the drive unit; a wheel motor arranged to drive the wheel about the wheel axis; and a steering motor arranged to drive the wheel about the steering axis;

wherein the actuation member is movable in an additional degree of freedom; and wherein the method comprises:

driving the wheel of the first drive unit about the wheel axis such that the first drive unit moves relative to the second drive unit, and such that the actuation member moves in the additional degree of freedom.

17. The method according to claim 16, wherein the additional degree of freedom is a translational degree of freedom.

\* \* \* \* \*